(12) United States Patent
Wortmann et al.

(10) Patent No.: US 9,470,369 B2
(45) Date of Patent: Oct. 18, 2016

(54) PIPELINE SYSTEM AND METHOD FOR DRAINING A PIPELINE SYSTEM

(75) Inventors: Jürgen Wortmann, Limburgerhof (DE); Michael Lutz, Speyer (DE); Martin Gärtner, Worms (DE); Kerstin Schierle-Arndt, Zwingenberg (DE); Stephan Maurer, Neustadt-Gimmeldingen (DE); Michael Ladenberger, Ludwigshafen (DE); Karolin Geyer, Mannheim (DE); Florian Garlichs, Neustadt (DE)

(73) Assignee: BASF SE, Ludwigshafen (DE)

( * ) Notice: Subject to any disclaimer, the term of this patent is extended or adjusted under 35 U.S.C. 154(b) by 58 days.

(21) Appl. No.: 13/604,106

(22) Filed: Sep. 5, 2012

(65) Prior Publication Data

US 2013/0056081 A1    Mar. 7, 2013

Related U.S. Application Data

(60) Provisional application No. 61/531,114, filed on Sep. 6, 2011.

(51) Int. Cl.
*F24J 2/04* (2006.01)
*F17D 3/00* (2006.01)

(52) U.S. Cl.
CPC ............ *F17D 3/00* (2013.01); *Y10T 137/0324* (2015.04); *Y10T 137/877* (2015.04)

(58) Field of Classification Search
CPC .............. F24J 2/04; F24J 2/05; F24J 2/0483; F24J 2/245; Y02E 10/45; Y02E 10/40; Y02B 10/22; F17D 3/00; Y10T 137/877; Y10T 137/0324

USPC .......... 137/2, 312, 861, 599.01, 544, 565.11, 137/565.18, 637; 60/641.11, 641.15, 641.8; 126/617, 651, 655
See application file for complete search history.

(56) References Cited

U.S. PATENT DOCUMENTS

| | | | |
|---|---|---|---|
| 3,968,652 A | 7/1976 | Chevalier | |
| 4,127,103 A * | 11/1978 | Klank et al. | 126/643 |
| 4,147,155 A * | 4/1979 | Krafft | 126/651 |
| 4,253,491 A * | 3/1981 | Worthen et al. | 137/601.2 |
| 4,324,229 A * | 4/1982 | Risser | 126/603 |
| 5,862,800 A * | 1/1999 | Marko | 126/680 |
| 6,701,711 B1 * | 3/2004 | Litwin | 60/641.11 |

(Continued)

FOREIGN PATENT DOCUMENTS

WO    WO 2010052710 A2 *    5/2010

OTHER PUBLICATIONS

International Search Report in PCT/EP2012/067300 dated Jan. 31, 2013.

*Primary Examiner* — Jessica Cahill
(74) *Attorney, Agent, or Firm* — Drinker Biddle & Reath LLP

(57) ABSTRACT

Described is a pipeline system for conveying a salt melt, comprising at least one pipeline (5) through which the salt melt flows, at least one inlet and at least one outlet, wherein the pipeline (5) through which the salt melt flows has at least one gradient inclined with respect to the horizontal and is respectively connected at the lowest positions via a drainage valve (25) to a drainage line (27) and at the highest positions to a venting valve (23). Also described is a method for draining the pipeline system.

19 Claims, 3 Drawing Sheets

(56) References Cited

U.S. PATENT DOCUMENTS

| | | |
|---|---|---|
| 7,011,086 B2 * | 3/2006 | Litwin .......................... 126/651 |
| 2004/0108099 A1 | 6/2004 | Litwin |
| 2005/0126560 A1 | 6/2005 | Litwin |
| 2006/0130654 A1 * | 6/2006 | King et al. ...................... 95/231 |
| 2009/0199557 A1 * | 8/2009 | Bennett ...................... 60/641.15 |
| 2009/0260359 A1 | 10/2009 | Palkes |
| 2010/0101564 A1 | 4/2010 | Iannacchione et al. |
| 2010/0199974 A1 | 8/2010 | Plotkin et al. |
| 2011/0139144 A1 * | 6/2011 | Zheng .......................... 126/588 |
| 2011/0277470 A1 * | 11/2011 | Benyaminy et al. ......... 60/641.8 |

* cited by examiner

PIPELINE SYSTEM AND METHOD FOR DRAINING A PIPELINE SYSTEM

PRIORITY

Priority is claimed to U.S. Provisional Patent Application Ser. No. 61/531,114, filed Sep. 6, 2011, the disclosure of which is incorporated herein by reference in its entirety.

The invention relates to a pipeline system for conveying a salt melt, comprising at least one pipeline through which the salt melt flows, at least one inlet and at least one outlet. The invention furthermore relates to a method for draining a pipeline system for conveying a salt melt.

Pipeline systems for conveying a salt melt are used for example in solar power plants, particularly in parabolic trough solar power plants or Fresnel power plants. The pipeline systems are generally configured in the form of networks, which are used to collect solar energy in the solar power plant. In such a solar power plant, the radiation energy of the sun is concentrated by means of parabolic mirrors onto receivers. The parabolic mirror and receiver combination is referred to as a collector. A row of collectors is connected in series to form so-called solar loops. To this end, the receivers are respectively connected to the pipeline system or constitute a part of the pipeline system. A heat transfer liquid, to which the radiation energy collected by the receivers is transferred, flows through the pipeline system.

At present, a biphenyl/diphenyl ether mixture in particular is used as the heat transfer liquid, although the maximum operating temperature of this is limited by its decomposition temperature of about 400° C. In order to achieve higher operating temperatures, which allow greater efficiency, other heat transfer liquids are necessary. To this end salt melts, for example so-called solar salt which is a mixture of sodium nitrate and potassium nitrate in a ratio of 60:40, are used in particular.

A disadvantage of salt melts is, however, that they have high melting points. A sodium nitrate/potassium nitrate mixture melts, for example at the eutectic, that is to say with a mixing ratio of 44:56, at a temperature of 218° C. In long pipeline systems, such as are encountered in solar power plants, salt melts with high melting points are difficult to work with reliably. Freezing of the salt melt can cause great economic damage in pipeline systems. One reason for the damage is, for example, the large volume expansion of salts when they melt. There is a risk that valves and pipelines will be placed under pressure and greatly damaged.

When the salt melt freezes, which may essentially happen outside the operating times of the solar power plant, that is to say outside the radiation times of the sun or when the solar radiation is interrupted owing to the weather, a volume contraction takes place which can lead to a different solidification state depending on the pipeline system and operating state. It is to be expected that, in general when unvented, evacuated bubbles will be created in the pipeline and merge to form more or less sizeable units. When remelting takes place, owing to a possibly large spatial distance between the melting sites with volume expansion and the evacuated regions, there may be insufficient volume compensation to relieve pressures building up.

In order to prevent freezing of the salt melt in the pipeline system, it is customary to drain the pipeline system during prolonged offline times. In the case of current pipeline systems having a storage container for the salt melt, however, the drainage takes a long time and cannot be ensured reliably in particular for sudden outages, for example in the event of an electricity failure, so that damage to the pipelines can occur especially in such cases.

For the drainage, a drainage container is currently provided which is installed in a pit and is protected against spillage by a container trough. The individual solar loops, which are formed by the pipeline system, have a slight gradient of about 0.3% so that during drainage the liquid contained in the pipelines is driven in the direction of the drainage container because of the gradient.

In modern systems with only one drainage container, the slight gradient used is generally insufficient for sufficiently rapid and complete drainage of, in particular, pipeline systems with long pipelines such as are used in parabolic trough solar power plants or Fresnel power plants and which may often have a total pipeline length of 100 kilometers. On the other hand, it is customary to use valves and cocks which do not have a safety position. Thus, in the event of a power failure, the valves may not for example lead the solar loop into a safe drained state. In this case, freezing of the salt used as a heat transfer medium is certainly likely. The solution of backing up the power supply by a substitute source is not sufficiently secure against all functional problems in the system. Lastly, drainage into a central drainage container entails long flow paths and flow times, with the risk that the heat transfer salt will solidify during the flow. Furthermore, a problem in one solar loop can lead to all the other solar loops being taken off line.

Furthermore, in currently used pipeline systems, collector banks are generally connected to the distributors for the heat transfer medium through flexible hoses or ball-joint connections. These, however, are not configured with a continuous gradient. During drainage, therefore, there is a risk that salt residues will remain in the flexible connections and solidify there.

Currently, salt with a low melting point is generally used in order to minimize the problems occurring in the pipelines due to the salt melt. Such salt melts, however, have considerable disadvantages. Examples of known heat transfer salts with a low melting temperature are mixtures of nitrates and nitrites of sodium and potassium, and of potassium nitrate, sodium nitrate and calcium nitrate.

Such mixtures, however, have a lower thermal stability than the solar salt conventionally used, consisting of potassium nitrate and sodium nitrate, so that the working range is limited to a temperature of less than 500° C. The effect of this is that a lower efficiency of the power plant has to be accepted. The salts furthermore have to be kept in closed systems, which leads to additional outlay in the area of the solar field since inerting systems, gas purifying systems or gas balance systems have to be installed in the solar field. The inerting is necessary because, on the one hand in the case of salts containing nitrite, atmospheric oxygen can oxidize the nitrite into nitrate and the melting point of the salt can therefore rise uncontrolledly, and, in the case of systems containing calcium, carbon dioxide reacts with calcium ions to form insoluble calcium carbonate.

Other alternative salts contain significant amounts of expensive and not readily available elements, which restrict economic use to systems with low hold-up. Examples of expensive components in these salts are lithium, rubidium and cesium.

Heat transfer systems other than salts generally have a high vapor pressure or entail considerable outlay for the corrosion protection of long pipeline systems.

Systems for heating salt bath reactors are known from the chemical industry, at the lowest point in which there is a drainage tank covered with nitrogen. All control devices in the system are in a safety position, so that in the event of an unintended operating state the molten heat transfer salt, generally a binary mixture of sodium nitrite and potassium nitrate, flows into the drainage container. To this end, all the pipelines are arranged with a gradient in the direction of the drainage container. The pipelines have such a large diameter that the lines are emptied even if no further venting is provided. Regions incapable of flow, for example above control devices and downpipes, have their own drainage lines via which they can be drained even in the event of valve blockage. The molten heat transfer salt is transported from the drainage containers with the aid of immersion pumps into the chemical systems.

These typical solutions of salt bath reactors, however, are not applicable and not sufficient in a solar field owing to its large size. For example, it is not suitable to use one drainage container for a solar power plant since the drainage process would take much too long to reliably prevent freezing. Furthermore, salt bath reactors are generally operated continuously, that is to say the system runs continuously after start-up of the reactor until the next revision. Until then, the system is constantly hot and there is flow through all the parts of the system. By means of this, an attempt is made to avoid obstructions occurring because of solidification of the salt, which could be removed only with great difficulty—if at all. Solar power plants, however, are subjected to a continual on-off cycle. For example, the solar field is not supplied with radiation energy at night. Continuous hot operation of all the parts of the system would lead to excessive radiation losses in the solar field. In order to avoid the high radiation losses, it is therefore expedient to operate the solar power plant discontinuously, particularly in order to keep overnight energy losses low.

Furthermore, salt bath reactors and pipeline systems in solar power plants differ in their size. For instance, salt bath reactors conventionally have pipeline lengths of at most a few hundred meters, while the length of the pipelines in parabolic trough solar power plants can exceed 100 kilometers. This also entails an amount of salt greater by a factor of about 1000. Merely owing to their size, therefore, these pipeline systems in solar power plants cannot be operated in a similar way to pipeline systems for example in salt bath reactors.

It is therefore an object of the present invention to provide a pipeline system for conveying a salt melt and a method for draining a pipeline system for conveying a salt melt, which can be used in solar power plants and do not have the disadvantages of the prior art.

The object is achieved by a pipeline system for conveying a salt melt, comprising at least one pipeline through which the salt melt flows, at least one inlet and at least one outlet, wherein the pipeline through which the salt melt flows has at least one gradient inclined with respect to the horizontal and is respectively connected at the lowest positions via a drainage valve to a drainage line and at the highest positions to a venting valve.

The object is furthermore achieved by a method for draining a pipeline system for conveying a salt melt, in which the drainage valves and the venting valve are opened for drainage so that the salt melt can flow out of the pipeline through the drainage line.

The advantage of providing the venting valve is that gas can flow back into the pipeline system during drainage and the drainage can thereby be accelerated in comparison with drainage without gas flowing back in. Furthermore, the diameter of the pipelines can be kept smaller without salt melt becoming blocked during drainage from inside the pipelines.

For example, in a closed system without a corresponding venting valve, the flow of the salt out would be hindered by air flowing against it. Particularly in thin pipelines and in the case of a very small gradient, the salt would not be able to flow away at all.

A gas suitable for being supplied to the pipeline system through the venting valves is, for example, air when using a salt which does not oxidize in the presence of oxygen. Thus, venting with air is possible in particular when using a solar salt, that is to say a mixture of potassium nitrate and sodium nitrate, preferably in a ratio of 40:60, wherein the air can be freed from water vapor and/or carbon dioxide.

When using a salt in the pipeline system which reacts chemically in the presence of atmospheric oxygen, for example a salt which contains calcium ions or nitrite, a gas which is inert with respect to the salt being used, for example nitrogen, will be supplied through the venting valve.

In order to permit full drainage of the pipeline system when required, it is preferable for all components of the pipeline system to be formed with a gradient. For example, receiver banks in parabolic trough solar power plants are arranged in a mobile fashion so that the parabolic mirrors can always ideally capture the radiation energy of the sun. In order to be able to move the receiver banks, the pipelines extending through the receiver banks are configured in a mobile fashion and, for example, connected by flexible lines to statically installed connections such as manifolds, distributors and drainage lines. The flexible lines, to which the individual receiver banks are connected, are also to be installed with a continuous gradient from the venting valve to the drainage valve in order to be able to permit reliable drainage. Movement arcs such as are currently used according to the prior art, and which extend upward, are to be avoided in this case. If movable receiver banks are used, at least one position has to be provided which allows the salt melt to drain off. This position must be fail-safe, that even in case of power failure the receiver banks move in a position which allows the salt melt to drain off. This can be achieved for example driven by spring or pressurized air. If the position which allows the salt melt to drain off shall be achieved spring driven, it is advantageous to use pressurized air storage units.

In a preferred embodiment, each drainage valve and each venting valve in the pipeline system is a valve with a failsafe function, which opens when a situation requiring drainage occurs. Such situations which require drainage are, for example, the occurrence of an elevated temperature or a reduced temperature in the solar loop, the occurrence of an elevated pressure or a reduced pressure in the solar loop, a deviation of the quantity flowing through the solar loop or an electricity failure. Furthermore, the drainage may also be instigated for example by automatic control, for example overnight drainage in continuous operation or drainage when the solar irradiation is not sufficient for the solar power plant to be operable safely. Furthermore, drainage should also be possible for manual intervention.

The occurrence of an elevated or reduced temperature in the solar loop or an insulation problem may, for example, be localized rapidly by an infrared optical scanning system over the entire solar field. Such a scanning system may also, for example, trigger drainage of the pipeline system when values deviating from the standard are measured.

The drainage valves and venting valves used as valves with a failsafe function are closed during normal operation of the solar power plant. When drainage takes place, the valves are automatically opened. In the case of the venting valve, this means opening the valve, and in the case of the drainage valve this means opening the pipeline into the drainage line so that the salt melt can flow out of the pipeline system into a drainage container.

In a solar power plant, the individual pipelines of the pipeline system are conventionally configured as a U-shaped loop, the inlet and outlet respectively being arranged at the branch ends of the U-shaped loop. The branch ends are in general respectively connected to a manifold line, the salt melt being delivered to the pipeline via one manifold line in continuous operation and the heated salt melt being removed from the pipeline via the other manifold line and fed into an evaporator. In the evaporator, water is evaporated and superheated by the salt melt and an electricity generation turbine is driven using the steam produced in this way. The salt melt is cooled in the evaporator and fed back via the manifold line into the pipelines of the pipeline system, where the salt melt is heated again in the receivers.

In a preferred embodiment of the invention, the drainage valves provided in the pipeline system are arranged so that both the pipeline and the inlet and respectively the outlet are drained into the manifold lines when they are opened. In order to permit rapid drainage of the pipeline system, it is in this case preferable that each individual solar loop can be drained via drainage valves into the drainage line.

In order to minimize the respective distances which the salt melt has to travel for drainage, it is furthermore preferable to position the venting valve centrally between the drainage valves of the U-shaped pipeline. This ensures that the maximum distance from the venting valve to the drainage valve in the respective pipeline is always of the same length.

In order to be able to further accelerate the drainage of the pipeline, it is furthermore preferable for the venting valve to be connected to a pressurized gas line. Depending on the salt used, compressed air may for example be used as the pressurized gas if the salt melt does not contain any components which react chemically with constituents of air. As an alternative, it is for example also possible to use an inert gas as the pressurized gas, for example nitrogen, or alternatively synthetic air or $CO_2$-scrubbed air. By using a pressurized gas, when the venting valve is opened gas is introduced under pressure into the pipeline and the salt melt is thus expelled from the pipeline. This leads to accelerated drainage. In order to obtain a failsafe pressurized gas supply, it is particularly preferable for the pressurized gas to be provided in pressurized gas storage units, which are connected to the venting valve via the pressurized gas line. The pressurized gas storage units can be set up decentralized.

In one embodiment of the invention, the pipeline system comprises at least two pipelines preferably configured in the shape of a U, which respectively have a gradient inclined with respect to the horizontal and are respectively connected at the lowest positions via a drainage valve to a drainage line and at the highest positions to a venting valve. The use of at least two, and preferably more than two pipelines makes it possible to reduce the total length of the individual pipelines. Connecting the respective pipeline to a drainage valve furthermore serves the purpose that each individual pipeline can be drained separately and it is not necessary to drain all the pipelines via the common manifold line. This also allows more rapid drainage than drainage via the manifold lines into a common drainage container.

In order to collect the salt melt taken from the pipelines, it is preferable for the drainage lines respectively to be connected to a drainage container. In this case, it is furthermore advantageous for the drainage containers to be positioned close to the respective pipeline in order to avoid long distances from the pipeline into the pipeline container and therefore long drainage lines.

In order to be able to remove the salt fully from the pipelines, it is furthermore advantageous for the drainage containers to have a volume which corresponds at least to the volume of all the pipelines opening via the respective drainage lines into the drainage containers.

In order to reduce the number of drainage containers, it is furthermore possible to segment the pipeline system, each segment having at least two pipelines and each segment being assigned a drainage container. The segments are in this case selected so that sufficiently rapid drainage into the drainage container is possible and the total pipeline length, in particular of the drainage lines, can still be kept short enough. In such a segment, for example, it is possible first to drain the individual pipelines of the pipeline system via drainage valves respectively into a drainage line, combine the drainage lines to form a common manifold line and make this open into the drainage container. If problems then occur during drainage for example in one pipeline, the effect of this is that any damage can occur at most in the segment containing the pipeline or this segment cannot be started up again without problems. The other segments, however, can still be operated without problems.

As an alternative or in addition to applying a pressurized gas to the pipeline via the venting valve, it is also possible respectively to evacuate the drainage containers. In this case, when the venting valves are opened, the air pressure leads to accelerated drainage of the pipelines into the drainage container. Evacuation of the drainage containers has the further advantage that rapid and reliable drainage is possible even if, for example owing to an electricity failure, sufficient pressurized gas is not available. Rapid pressure-driven drainage is possible in this case against ambient pressure when opening the venting valve to the environment.

Further, as an alternative or in addition it is possible that the pipeline is routed in such a way that the pipeline has a steep incline with a high hydrostatic potential difference near the drainage container. For this purpose it is possible, for example, to place the drainage container in a ground depression, for example with a depth of 2 to 5 m. In this case a high driving hydrostatic pressure is effective on the salt melt. It is possible to prevent the penetration and ascension of gases from the overlaying gas in the drainage container in opposition to the flow direction and drainage direction by a dipped insertion of the salt melt via a dip tube into the drainage container. To prevent a rupture of the liquid column while flowing, it is necessary that there is a pressure at each position of the liquid column which is higher than the vapor pressure of the salt melt. It is possible to set the pressure in the salt melt by a high flow resistance near the drainage container or in the dip tube into the drainage container. For this purpose, it is possible, for example, to install baffles or systems for a direction change, which have the additional advantage that erosive corrosion of the container walls is reduced.

When using the pipeline system in a solar field of a solar power plant, particularly in a solar field of a parabolic trough solar power plant or a Fresnel power plant, the salt melt preferably contains at least one nitrite or at least one nitrate of the alkali metals or alkaline earth metals. Preferred are nitrite or nitrate of sodium, potassium or calcium, or any mixture of these salts. A mixture of sodium nitrate and potassium nitrate in a ratio of 60:40 is particularly preferably used. Further particularly preferred is a mixture of nitrite and nitrate of potassium and sodium in any mixture, also denoted as nitrite salt. Besides this so-called solar salt, it is also possible to use any other salts with a high melting point which are suitable as a heat transfer medium. In the context of the present invention, a high melting point means a melting temperature of at least 100° C. It is furthermore preferable for the salt to be thermally stable even above temperatures of 470° C.

Exemplary embodiments of the invention are represented in the figures and will be explained in more detail in the description below.

Figure 1:
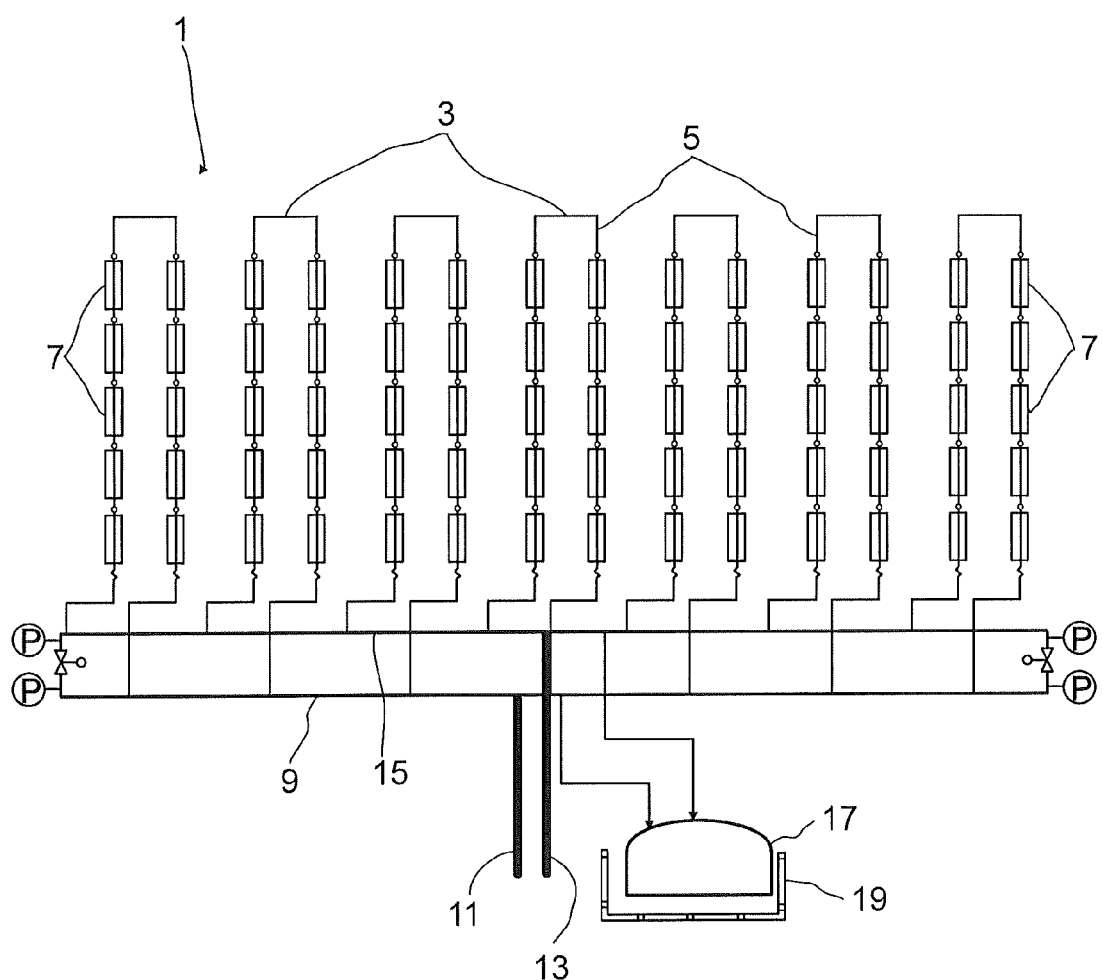
FIG. 1 shows a solar field of a parabolic trough solar power plant having a drainage container according to the prior art.

A solar field 1 of a parabolic trough solar power plant has a plurality of solar loops 3. The solar loops 3 are respectively formed with a pipeline 5 through which a heat transfer medium flows. According to the invention a salt melt, preferably solar salt, that is to say a mixture of potassium nitrate and sodium nitrate in a ratio of 40:60, or as a eutectic with a mixing ratio of 44:56, or nitrite salt is used as the heat transfer medium.

In solar loops 3, the heat transfer medium is heated by means of incident solar energy. To this end, the pipelines 5 are enclosed segmentally by a glass tube. The space between the pipeline 5 and the glass tube 7 is evacuated. Below the glass tube 7, there is furthermore a parabolic trough in which incident sunlight is reflected and directed onto the glass tube 7. Owing to the radiation incident on the glass tube 7, heat is delivered to the heat transfer medium which flows through the pipeline 5, so that the heat transfer medium is heated.

The heat transfer medium flowing through the pipelines 5 of the solar loops 3 flows into a manifold 9, and from the manifold 9 on to a heat transfer medium outlet 11. The heat transfer medium flowing through the heat transfer medium outlet 11 is conventionally fed into a heat exchanger, where it releases heat to a steam circuit by which, for example, electricity generation turbines are driven. The cooled heat transfer medium leaving the heat exchanger is fed via a heat transfer medium inlet 13 into a distributor 15, and from the distributor 15 into the pipelines 5 of the solar loops 3.

In order to be able to drain the pipelines of the solar power plant during offline times, a drainage container 17 is provided. The drainage container 17 is connected to the distributor 15 and the manifold 9. Via the manifold 9 and the distributor 15, the salt melt flows into the drainage container 17.

In order to prevent salt melt from flowing out and spreading uncontrolledly into the environment in the event of damage to the drainage container 17, the drainage container 17 is preferably enclosed by a trough 19, the capacity of the trough 19 corresponding to the volume of the drainage container 17.

Figure 2:
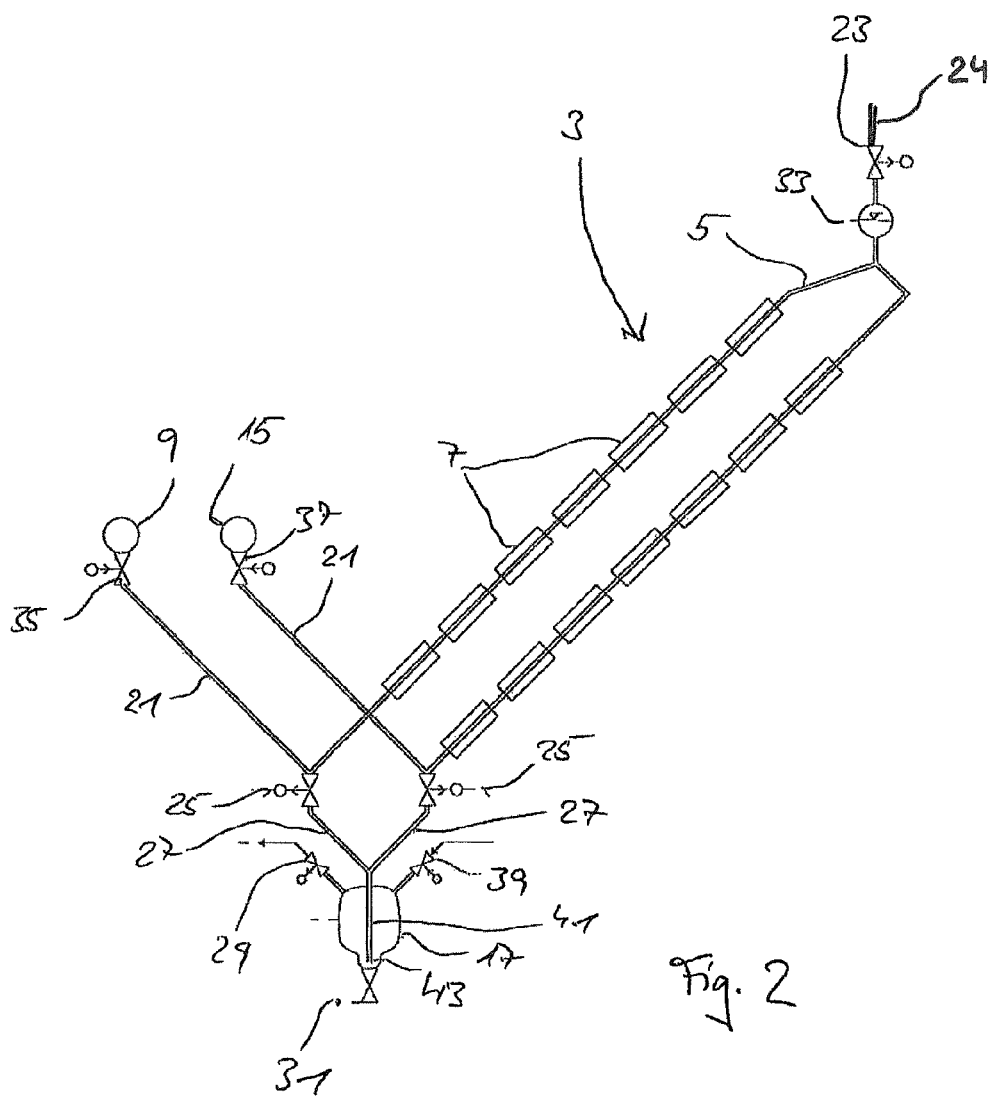
FIG. 2 shows a solar loop of a solar power plant having a drainage device according to the invention.

FIG. 2 represents by way of example a solar loop having a pipeline system formed according to the invention.

The solar loop 3 has a pipeline 5 which is configured essentially in the shape of a U, and is connected by one branch to the manifold 9 and by the second branch to the distributor 15. The connections of the pipeline 5 to the manifold 9 and distributor 15 are respectively established via connecting pipes 21.

According to the invention, the pipeline 5 has a gradient inclined with respect to the horizontal. The gradient is preferably in the range of from 0 to 1%. In one embodiment the gradient is preferably in the range of from 0.1 to 0.5%, particularly preferably in the range of from 0.2 to 0.4%. In an alternative embodiment the gradient is in the range of from 0 to 0.3%, preferably in the range of from 0.01 to 0.2%. The gradient of the pipeline 5 in each case extends from a venting valve 23 to a drainage valve 25. In the embodiment represented here, each of the branches of the U-shaped pipeline 5 is connected to a drainage valve 25. The drainage valve 25 closes or opens a connection of the pipeline 5 and the connecting pipe 21 to a drainage line 27. During normal operation, the drainage valve 25 is closed. The drainage lines 27 open into a drainage container 17, which is configured to be large enough so that it can receive all of the salt melt contained in the pipeline 5.

The drainage container 17 is equipped with a relief valve 29, which opens when the pipeline 5 is being drained. This avoids a pressure buildup in the drainage container 17. So that the drainage container 17 can be drained when required, it furthermore has an outlet valve 31.

The valves used, that is to say the venting valve 23, drainage valves 25, relief valves 29 and outlet valve 31 may have any desired form. For example, it is possible to use rotary disk valves, disk valves, flap valves and cock valves. In the scope of the present invention, the term valve is also intended to include disk valves and flap valves which can only be switched between an open position and a closed position. It is, however, preferable to use valves with which the throughput can also be controlled, that is to say any desired alternative aperture cross section can be achieved besides the "open" and "closed" positions.

During normal operation of the solar power plant, the venting valve 23 may also be used as a relief valve, for example in order to be able to remove inert gases from the solar melt. To this end, a phase separator 33 is preferably provided in addition to the venting valve 23. In the phase separator 33, the gas is separated from the salt melt and can then be removed through the valve 23.

During normal operation, the venting valve 23 and the drainage valves 25 are closed. The salt melt flows from the distributor 15 into the pipeline 5 and is heated in the receivers formed by the glass tubes 7 and parabolic trough mirrors. The solar melt heated in this way then flows via the second connecting pipe 21 and the manifold 9 into a heat exchanger, where the heat is released to a connected steam circuit.

During a functional problem of the system or in the event of a power loss, for example owing to an electricity failure, or in case of intended drainage, the venting valve 23 is opened. At the same time, the manifold valve 35 and the distributor valve 37 are closed so that salt melt can no longer pass from the manifold 9 or the distributor 15 via the connecting pipes 21 into the pipeline 5. Furthermore, the drainage valves 25 are switched so that the connection from the pipeline 5 into the drainage line 27 is opened. Owing to the gradient in the pipeline 5, the salt melt is drained from the pipeline 5 into the drainage container 17 via a dip tube 41 by being driven by the force of gravity. In order to assist the drainage process, it is possible to apply a pressurized gas to the venting valve 23, so as to expel the salt melt from the pipeline 5 into the drainage container by the applied pressure. In addition or as an alternative, it is also possible to evacuate the drainage container 17 in order to further accelerate the drainage process. To apply a pressurized gas to the venting valve 23, the venting valve 23 is connected to a pressurized gas line 24.

If the drainage container 17 is not evacuated, the relief valve 29 will be opened in order for gas contained in the drainage container 17 to be able to flow out during the drainage process, so that a pressure is not built up in the drainage container 17.

In order to start the solar loop up again after a drainage operation, the relief valve 29 is first closed. Subsequently, the drainage valves 25 are switched so that the salt melt can flow from the drainage container 17 back into the pipeline 5. After this, a pressurized gas is fed to the drainage container 17 via a venting valve 39. The pressurized gas is in this case, depending on the salt used, for example compressed air, synthetic air, $CO_2$-scrubbed air or an inert gas, for example nitrogen. Compressed air can only be used if no chemical reaction of constituents of the air takes place with the constituents of the salt.

By application of the pressurized gas through the venting valve 39 into the drainage container 17, a pressure is built up in the drainage container 17. The pressure building up drives the heat transfer medium contained in the container 17 through the dip tube 41, which works as a riser pipe, into the drainage lines 27, and from there through the drainage valves 25 back into the pipeline 5. The drainage valves 25 are in this case opened slowly at the start of the filling process. At the expected end of the filling process, the valves 25 are slowly closed again. The actual end of the filling process is monitored by means of the smallest flow, optionally in pulsed operation. The termination of the filling is triggered by using a phase detector 43 at the end of the dip tube 41. When the filling process is terminated, the venting valve 23 is closed. Furthermore, the drainage valves 25 are also closed so that the flow can now pass from the pipeline 5 via the connecting pipes 21 to the manifold 9 and the distributor 15. In order to resume operation, the manifold valve 35 and the distributor valve 37 are then also opened. Gas contained in the pipeline is entrained with the salt flow and removed by the inert gas separation which is carried out by the phase separator 33 and the venting valve 23.

If there is too much salt in the drainage container 17, the excess amount can be delivered into the salt circuit by applying pressurized gas via the venting valve 39 and opening one of the drainage valves 25 while, simultaneously, the manifold valve 35 or distributor valve 37 are opened and the venting valve 23 is closed.

The rate at which the salt melt flows through the pipelines 9, 15, 21 and 5 can be controlled by the degree of opening of the respective valves 35, 37.

As an alternative to delivering the salt melt from the drainage container 17 by applying compressed air, it is also possible to use an immersion pump. In addition, the immersion pump may also be used to apply compressed air.

The drainage valves 25 and the venting valve 23 are preferably formed as valves with a failsafe function and switched so that in the event of a functional problem they are respectively open, in order that the salt melt contained in the pipeline 5 can flow out into the drainage container 17. The filling and drainage, respectively, of a solar loop 9 from and into a drainage container 17 allows rapid filling and drainage of the solar loops 3, so that the line system can be drained in the evening and filled in the morning with high functional reliability.

An increase in the functional reliability can be achieved by providing a suitable heating system in the pipelines. For heating, for example, it is possible to lay a heating element inside the pipeline. In this case, the salt inside the pipeline is initially melted on the heating element and forms a channel through which molten salt can be transported away. This will prevent an excessive pressure from being exerted on the pipeline 5 owing to the volume expansion of the salt melt. A uniform temperature distribution along the heating element also leads to the salt melting simultaneously around the heating element over the entire length of the pipeline 5, so as also to form a channel through which salt melt can flow and the pressure can thus be equilibrated.

Overheating of the salt melt in the pipeline is prevented by using a defocusing instrument of safety grade for the collectors.

Figure 3:
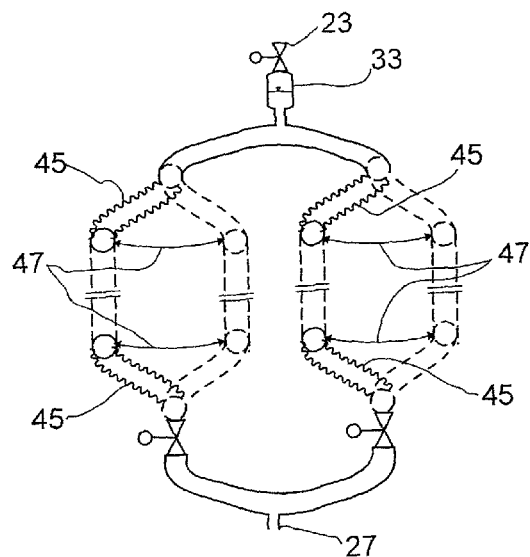
FIG. 3 shows a start section and an end section of a solar loop.

FIG. 3 schematically represents the inlet end of a solar loop and its end provided with the venting valve.

In order that the solar power plant can always be operated optimally, the individual receivers are preferably arranged in a mobile fashion so that the parabolic mirrors can optimally capture the radiation energy of the sun. To this end, it must be possible for the pipelines of the individual receivers to be swiveled. In order to make this possible, flexible lines 45 are installed between the mobile pipelines of the receivers and statically installed connections such as manifolds, distributors and the drainage line 27. The flexible lines 45 are in this case configured so that they have a gradient from the venting valve 23 to the drainage line 27, such that the salt melt can flow out.

A second position of the pipelines is shown by dashes in FIG. 3.

In the embodiment represented in FIG. 3, the venting valve 23 and the drainage line 27 are fixed and the pipelines lying between the drainage line 27 and the venting valve 23 are configured so that they can be swiveled. The swiveling is shown by arrow 47.

Figure 4:
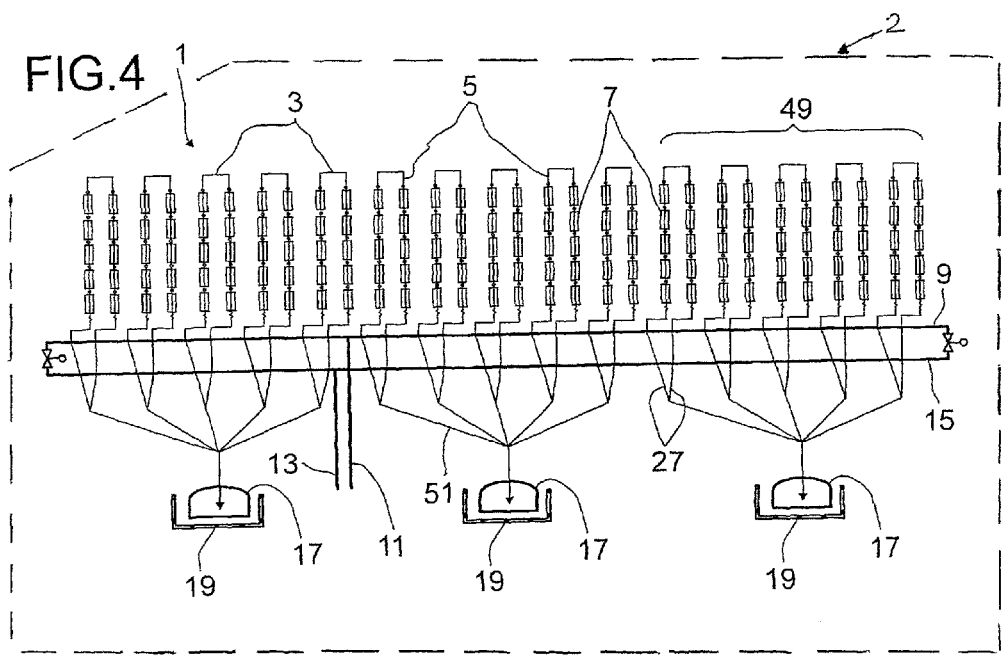
FIG. 4 shows a solar field of a parabolic trough solar power plant having a segmented pipeline system.

A solar field in which the pipeline system is segmented is represented in FIG. 4.

In the embodiment represented in FIG. 4, 5 solar loops 3 of a power plant 2 which may be for example a parabolic trough solar power plant or a Fresnel power plant, are respectively combined to form a segment 49. Each segment 49 is assigned a drainage container 17, into which the drainage lines 27 of the respective solar loops 3 open. Here the drainage lines 27 of a solar loop 3 are combined into a manifold line 51, which then opens into the drainage container 17. The size of the drainage container 17 is selected so that the salt melt from all the solar loops 3 of a segment 45 can be received by the drainage container 17. The number of solar loops 3 which are assigned to a drainage container 17 is selected so that drainage of the entire solar field can be carried out within a predetermined time. In this case, it should be taken into account that the drainage time is commensurately greater when more solar loops 3 have to be drained to a container 17.

LIST OF REFERENCES 1 solar field
3 solar loop
5 pipeline
7 glass tube
9 manifold
11 heat transfer medium outlet
13 heat transfer medium inlet
15 distributor 17 drainage container
19 trough
21 connecting pipe
23 venting valve
24 pressurized pipeline
25 drainage valve
27 drainage line
29 relief valve
31 outlet valve
33 phase separator
35 manifold valve
37 distributor valve
39 venting valve
41 dip tube
43 phase detector
45 flexible line
47 swivel region
49 segment
51 manifold line

The invention claimed is:

1. A pipeline system for conveying a salt melt in a parabolic trough solar plant or a Fresnel power plant, comprising at least one pipeline (5) through which the salt melt flows, at least one inlet and at least one outlet, wherein at least one receiver is placed in the pipeline (5) through which the salt melt flows and the pipeline (5) has at least one gradient inclined with respect to the horizontal in the range from 0.1 to 1% and is respectively connected at the lowest positions via a drainage valve (25) to a drainage line (27) and at the highest positions to a venting valve (23), wherein the drainage line (27) opens into a drainage container (17), and the drainage container (17) comprises a dip tube (41) via which the salt melt is drained from the pipeline (5) into the drainage container (17).

2. The pipeline system as claimed in claim 1, wherein each drainage valve (25) and each venting valve (23) is a valve with a failsafe function, which opens when a situation requiring drainage occurs.

3. The pipeline system as claimed in claim 1, wherein the venting valve (23) is connected to a pressurized gas line.

4. The pipeline system as claimed in claim 1, wherein the pipeline system comprises at least two pipelines (5), which respectively have a gradient inclined with respect to the horizontal and are respectively connected at the lowest positions via a drainage valve (25) to a drainage line (27) and at the highest positions to a venting valve (23).

5. The pipeline system as claimed in claim 1, wherein the drainage container (17) has a volume which corresponds at least to the volume of all the pipelines (5) opening via the respective drainage lines (27) into the drainage container (17).

6. The pipeline system as claimed in claim 1, wherein the drainage container (17) is evacuated.

7. The pipeline system as claimed in claim 1, wherein the pipeline system is used in a solar field of the parabolic trough solar power plant or the Fresnel power plant.

8. The pipeline system as claimed in claim 1, wherein the pipeline system is segmented, each segment (49) having at least two pipelines (5) and each segment (49) being assigned a drainage container.

9. The pipeline system as claimed in claim 1, wherein the pipeline (5) comprises at least one flexible section (45) which allows movement of the pipeline (5), the flexible section (45) being configured so that the pipeline (5) also has a gradient from the venting valve (23) in the direction of the drainage valve (25) in the region of the flexible section (45).

10. The pipeline system as claimed in claim 1, wherein the salt melt contains at least one nitrite or at least one nitrate of sodium, potassium or calcium, or any mixture of these salts.

11. The pipeline system as claimed in claim 1, wherein the pressure in the salt melt is set by a flow resistance near the drainage container or in a dip tube into the drainage container.

12. The pipeline system as claimed in claim 1, wherein the length of the pipelines exceeds 100 km.

13. The pipeline system as claimed in claim 1, wherein the pipeline (5) is configured as a U-shaped loop, the inlet and outlet respectively being arranged at branch ends of the U-shaped loop.

14. The pipeline system as claimed in claim 13, wherein the venting valve (23) is arranged centrally between the inlet and the outlet in the pipeline (5).

15. A method for draining a pipeline system for conveying a salt melt as claimed in claim 1, in which the drainage valves (25) and the venting-valves (23) are opened for drainage so that the salt melt can flow out of the pipeline (5) through the drainage line (27).

16. The method as claimed in claim 15, wherein the pipeline system is drained when the pressure, temperature and/or volume flow rate of the salt melt through the pipeline differ by more than a predetermined tolerance from a predetermined setpoint value, or when manual drainage or operationally required automatic drainage of the pipeline needs to be carried out.

17. The method as claimed in claim 15, wherein a pressurized gas is introduced into the pipeline (5) through the venting valve (23) during drainage.

18. The method as claimed in claim 17, wherein the pressurized gas is nitrogen, synthetic air, $CO_2$-scrubbed air or air.

19. A pipeline system for conveying a salt melt, comprising at least one pipeline (5) through which the salt melt flows, at least one inlet and at least one outlet, wherein the pipeline (5) through which the salt melt flows has at least one gradient inclined with respect to the horizontal and is respectively connected at the lowest positions via a drainage valve (25) to a drainage line (27) and at the highest positions to a venting valve (23), wherein said at least one pipeline is present in a parabolic trough solar power plant or a Fresnel power plant, wherein the drainage line (27) opens into a drainage container (17), wherein the drainage container (17) comprises a dip tube (41) via which the salt melt is drained from the pipeline (5) into the drainage container (17), and herein at the end of the dip tube (41) a phase detector (43) is arranged.

* * * * *